Sept. 24, 1963 J. P. RICH ETAL 3,105,043
FILTER
Filed May 26, 1960 4 Sheets-Sheet 1
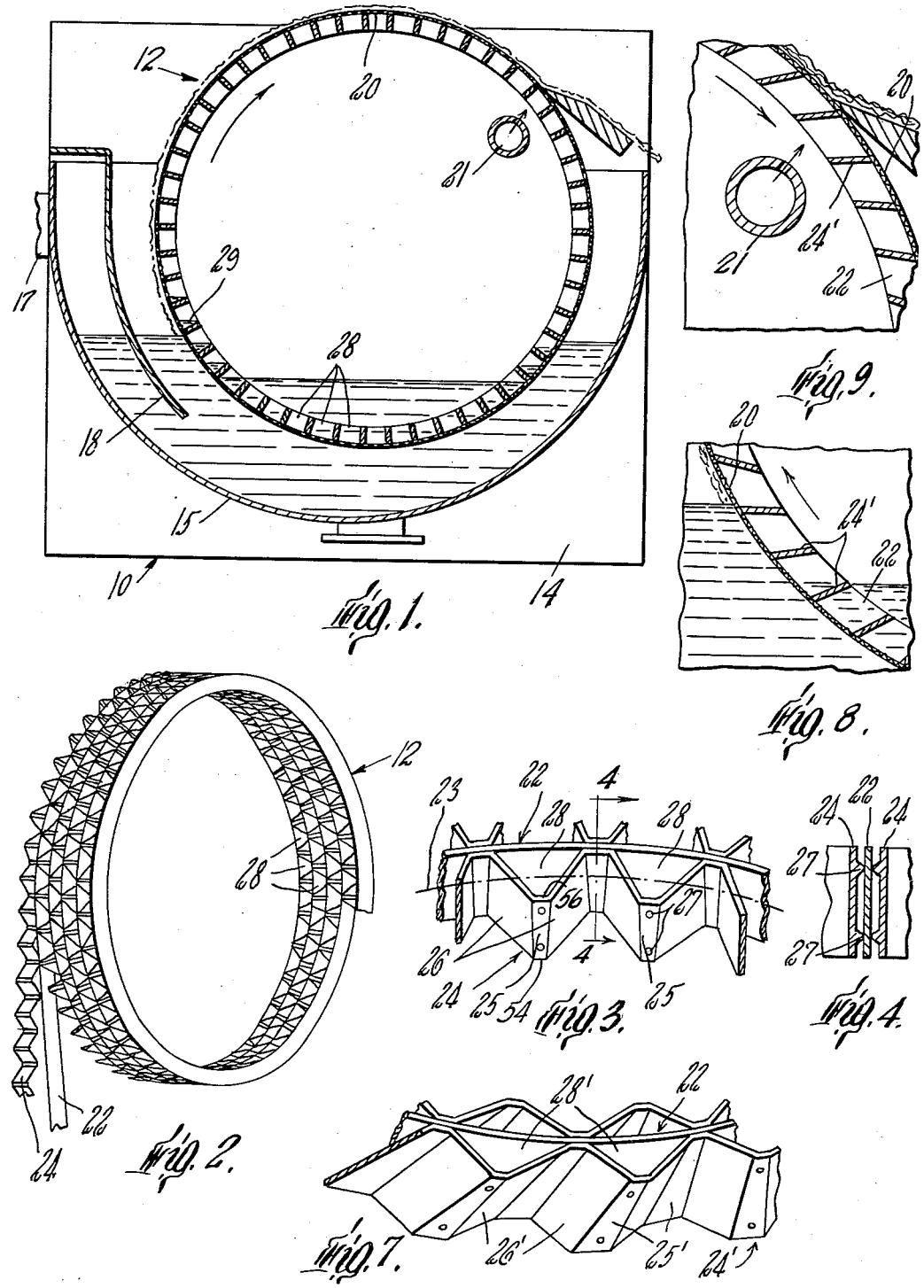

Sept. 24, 1963  J. P. RICH ETAL  3,105,043
FILTER
Filed May 26, 1960  4 Sheets-Sheet 2
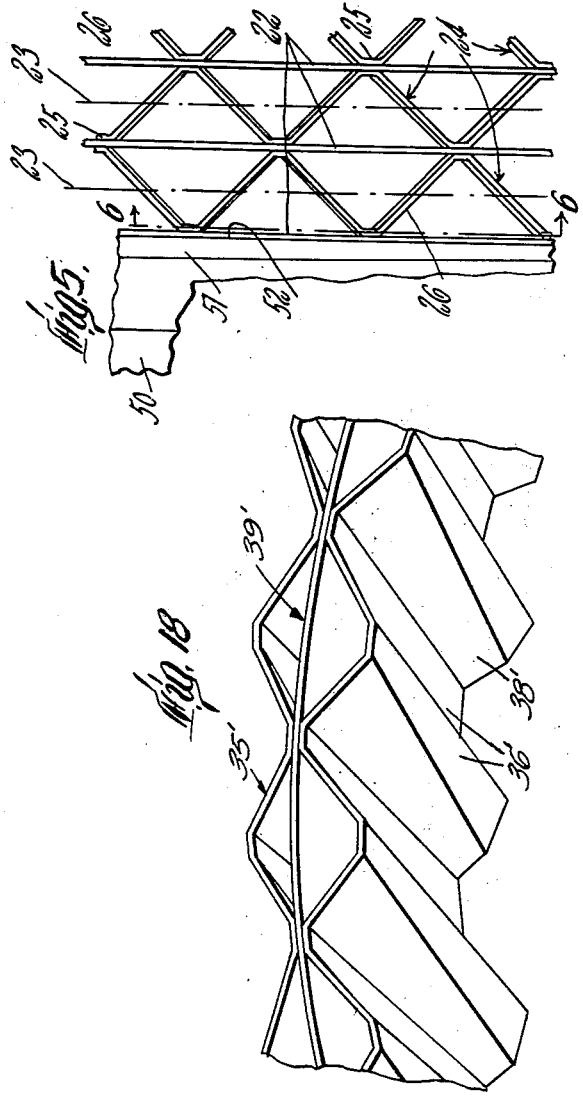
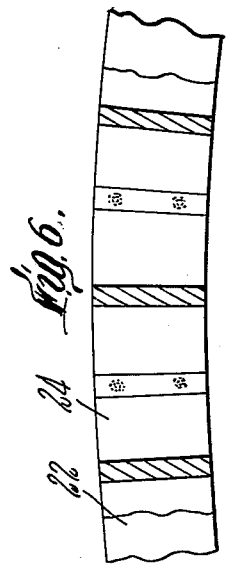

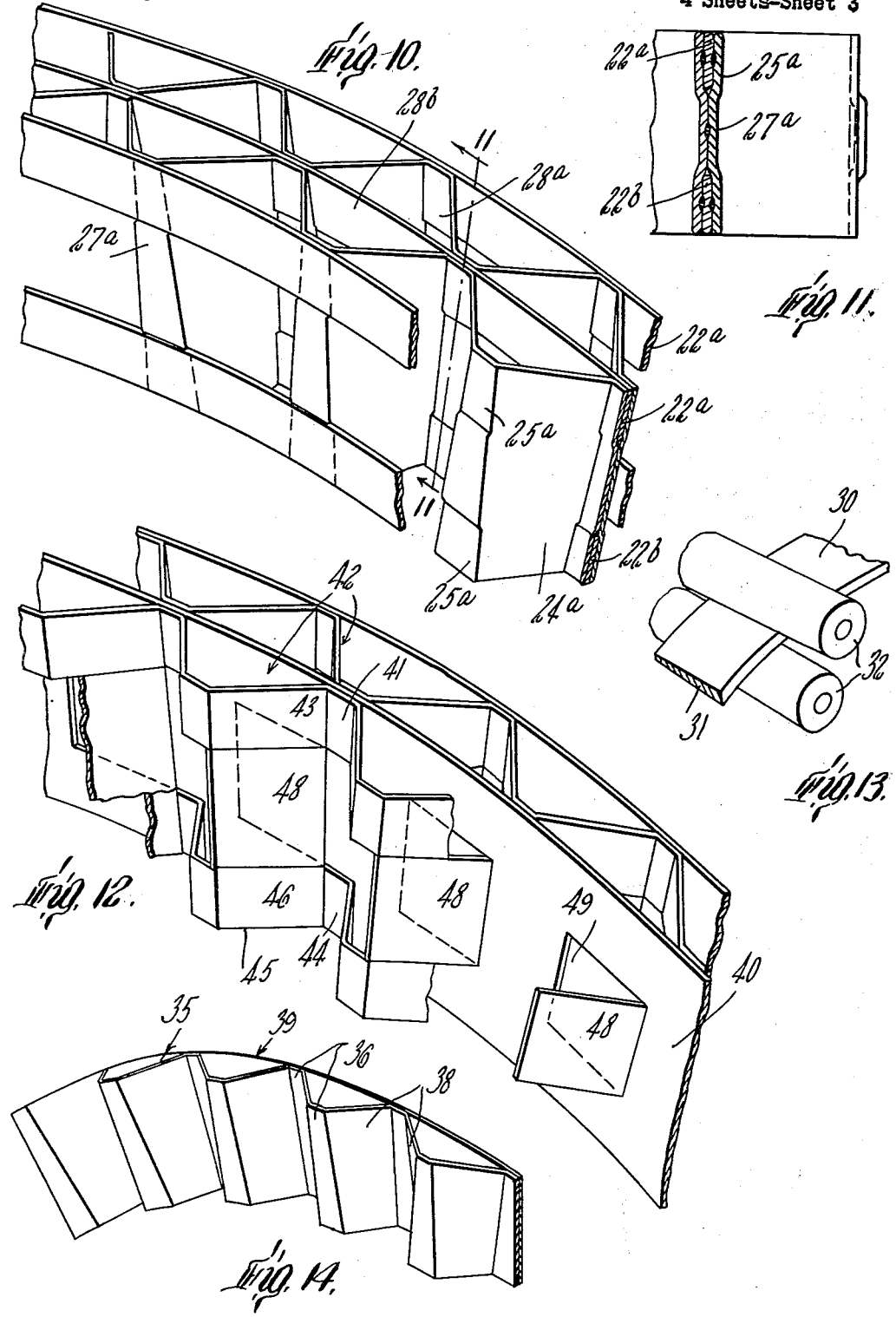

United States Patent Office 3,105,043
Patented Sept. 24, 1963

3,105,043
FILTER
John P. Rich and Oscar Luthi, Nashua, N.H., and Nelson Saunders, Groton, Mass., assignors to Improved Machinery Inc., Nashua, N.H., a corporation of Maine
Filed May 26, 1960, Ser. No. 31,855
8 Claims. (Cl. 210—402)

This invention relates generally to filter mechanisms which are especially suitable for the separation of liquid-solid mixtures. More particularly, it relates to a novel rotary filter apparatus having a unique filter drum structure.

In high production filter systems wherein screening or filtering of large quantities of liquid-solid mixtures is desired, rotary horizontal drum mechanisms have long been utilized. Heretofore, horizontal drum filters have consisted of a foraminous cylinder, usually screen wire covered, supported for rotation partially submerged in a tank containing a liquid-solid slurry to be filtered. Generally the cylinder was supported by a horizontal shaft and in turn a plurality of wheel-like spiders were mounted on the shaft to support the cylindrical form. A series of such spiders was necessary not only to prevent the cylinder from bending but also to maintain it in a true cylindrical shape, especially in the presence of forces due to the partial submergence of the drum in the slurry to permit passage of filtrate through the drum surface under the influence of reduced or atmospheric pressures needed for accreting a filter cake on the cylinder. The true cylindrical shape was essential because of the presence of a couch roll which operated against the outer surface of the cylinder throughout its length for the purpose of removing the accreted filter cake from the outer surface of the cylinder.

The cylinder itself took a number of forms. Thus, for small diameter structures a large number of holes were simply drilled through a cylinder such as a suitable length of pipe. Large structures were usually built up from a series of supporting angles and plates. Not only were these methods of construction slow and expensive, but with built up structures tended to be inaccurate insofar as precise cylindrical shape was concerned. Also, because of structural strength considerations, the ratio of openings to total area was quite small, usually less than 50%. This was known to be disadvantageous, but no adequate solution to this problem could be found while maintaining suitable cylindrical strength and rigidity. Furthermore, strength was a problem particularly when available fluid forces tended to distort the cylinder from its desired cylindrical shape. This effect occurred in liquid-solid separations with the cylinder operating partially submerged, especially when the interior of the drum was under a pressure less than atmospheric, as in a so-called vacuum filter.

Accordingly, it is a major object of the present invention to provide a filter having a novel cylindrical drum structure of great strength, yet wherein the ratio of openings to total area is upwards of 50% and may be upwards of 75%. This not only produces a more efficient structure from the standpoint of filtering efficiency, but one which for a given production rate may be made substantially smaller than heretofore known filters.

It is a feature of the invention that the drum structures provided may be made up from flat sheet metal strip or other suitable material such as certain plastics for economy and ease of construction to produce generally radial passageways, either strictly radial or slanted away from the direction of drum travel in the direction of fluid flow into the drum for improved drainage. Preferably, the strip formation extends continuously throughout the length of the drum.

Still another object of the invention is to provide an improved and more economical metal or plastic rotary drum filter construction than that of conventional rotary filter apparatus.

In accordance with the principles of the invention, the novel filter thereof includes a cylindrical tubular sheet metal or plastic grid structure which comprises one or more peripherally generally planar sheet strips having flat surfaces extending preferably in a helical path continuously around the circumference of the cylindrical grid for a plurality of turns, with their flat planar widthwise dimension extending radially of the cylinder adjacent its inner and outer cylindrical surfaces. The turns of the generally planar sheet strip are spaced from one another by a waved sheet metal or plastic strip which likewise extends continuously around the circumference of the cylindrical grid preferably helically for a plurality of turns with its widthwise dimension positioned radially thereof adjacent the inner and outer cylindrical surfaces of the tubular grid. The waved strip portions displaced from its central plane are attached as by welding or a suitable adhesive to the spaced adjacent turns of the planar generally flat strip or in addition to adjacent turns of the waved strip thus providing a cylindrical tubular grid having generally radial passages with walls defined by adjacent planar and waved strips. Such passages may either be strictly radial or slanted away from the direction of drum rotation in the direction of fluid flow into the drum for improved drainage. A series of alternating planar and waved ring-like elements may be also assembled to provide the cylinder of the invention but the helically arranged strips are preferred, since, by their use, welding of strip ends may be avoided.

For the purpose of describing further objects and features of the preferred embodiments of the invention, reference is now made to the following specification together with the accompanying drawings wherein:

FIG. 1 is a cross sectional end elevational view of apparatus constructed in accordance with the preferred embodiment of the invention and illustrating certain aspects of the drum structure of the invention;

FIG. 2 is a diagrammatic isometric view of a portion of the apparatus of FIG. 1 illustrating the assembly of novel drum structure of the invention;

FIG. 3 is an enlarged partial isometric view of a portion of the drum of FIG. 2;

FIG. 4 is an enlarged section of the drum of FIG. 2 taken on the line 4—4 of FIG. 3;

FIG. 5 is an enlarged partial projected plan view showing the novel drum structure of the apparatus of FIG. 3;

FIG. 6 is an enlarged partial side cross-sectional elevation of the drum structure of FIG. 5, taken on the line 6—6 thereof;

FIG. 7 is an enlarged partial isometric view of a modification of the drum of FIGS. 1–6;

FIGS. 8 and 9 are enlarged side sectional elevations of the drum of FIG. 7;

FIG. 10 is an enlarged partial isometric view of another modification of the drum of FIGS. 1–6;

FIG. 11 is an enlarged sectional partial elevation of the drum of FIG. 10;

FIG. 12 is an enlarged partial isometric view of another modification of the drum of FIGS. 1–6;

FIG. 13 is a diagrammatic view of apparatus suitable for manufacturing a portion of the drum structure of the invention;

FIG. 14 is an enlarged partial isometric view of another modification of the drum of FIGS. 1–6;

FIG. 18 is an enlarged isometric view of another modification of the drum of FIGS. 1-6.

Figure 15:
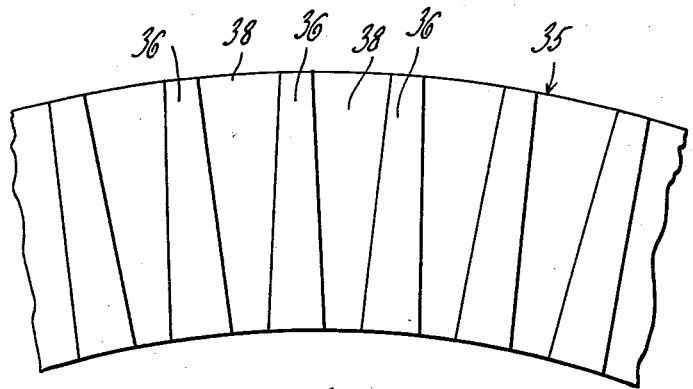
FIGS. 15 and 16 are respectively projected plan and elevational views of the modification of FIG. 14.

With reference to FIG. 1, there is shown a tank 10 in which a rotatable filtering drum 12 is adapted to be disposed for rotation about a horizontal axis. The tank includes two vertical spaced end walls, 14, and a wall portion 15 which joins the two end walls and forms the sides and base of the tank. The material to be filtered is introduced into the tank through the conduit connection 17. A baffle structure 18 which extends the length of the tank between the end walls guides the entering material so as to prevent direct flow thereof against the surface of the filtering member. An overflow connection is also provided, as well as a filter cake removal device 21 to which air under pressure is supplied, this pipe being disposed adjacent a suitable discharge chute and arranged so that air pressure may be used to aid in the freeing of the pulp mat accreted on the foraminous filter drum surface.

According to the present invention, the novel filter drum generally designated 12 and best shown in FIGS. 1-6, is a tubular member which will be hereinafter more fully described. However, in general, it is built up of an alternately arranged planar sheet metal or plastic helically wound flat strip 22 and a waved similarly arranged sheet metal or plastic strip 24, the strips having their flat widthwise dimension displaced radially of the cylinder and generally extending from its inner to its outer cylindrical surface providing a multiplicity of openings 28 extending generally radially through the so-formed grid-like structure providing generally radial passageways with walls defined by the adjacent strips. Preferably, the waved strip has straight parallel portions 25 displaced on either side of its central plane 23 with diagonal portions 26 extending therebetween across said central plane. Raised elements 27, preferably two in number and spaced widthwise of the strip are present on the parallel portions 25. With so arranged straight strips welded to one another as by spot welding at raised portions 27, a uniquely strong and rigid cylindrical tubular drum structure is provided because of the presence of the spaced straight strips 22 which resist radial deformation because of their straight flat and relatively deep radial dimension, so that, for example, with the width of strips in a radial direction of the order of 2 to 5% of drum radius, adequate drum rigidity both as to bending in its axial direction and as to roundness may readily be provided even with vacuum filters wherein the fluid force established may be quite high. Furthermore, the degree of openness and hence the restriction to fluid flow is far superior than with heretofore known filters, the degree of openness being generally upwards of 50% to over 75%. Hence the resulting fluid flow restriction is very low. Although in some instances the grid openings therein may be small enough so that no additional foraminous filtering structure is needed, in general, it will be found that a suitable screen 20 is preferably trained over the cylindrical surface of the shell to provide an appropriate filtering surface. At either end of the drum (FIG. 5) there is provided an outwardly extending rim 50, which is secured to a reinforcing ring 51 attached to the end of the tubular grid. Such ring 51 may have a helical surface 52 abutting the helical end of the tubular grid to which one of the strips may be welded or otherwise attached.

Figure 16:
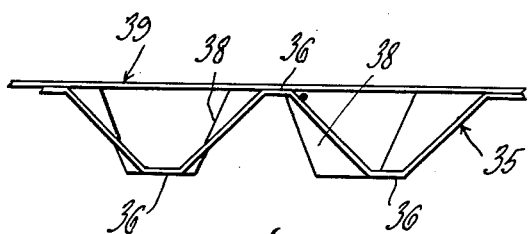
Figure 17:
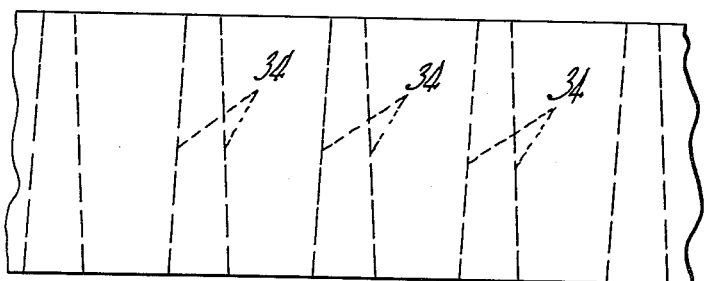
FIG. 17 is a diagrammatic view showing one aspect of the manufacture of the modification of FIG. 14.

The details of the grid construction providing the novel cylindrical drum of the invention may be most readily seen in FIGS. 3-6 (and in a slightly different form in FIGS. 14-17), wherein an enlarged showing illustrates the planar strip 22 and wave strip 24 with its side portions 25 and diagonal portions 26 (the side portions being shown in FIG. 3 to be in the form of truncated triangles with their narrower ends 54 radially inwardly towards the inside of the drum and their wider ends 56 radially outwards at the periphery of the drum), and raised portions 27 assembled to produce the novel drum structure of the invention, a short axial portion of which is shown in FIG. 2 with its multiplicity of radially extending openings 28, such openings extending for the width of the strips and being shown in FIG. 1 in cross section.

A somewhat modified drum construction is shown in FIGS. 7-9 wherein the side portions 25' and diagonal portions 26' of the waved strip 24' are bent so that the outer side thereof leads the inner side in the direction of drum rotation, so that the passageways 28' are inclined. The resulting action may best be understood by a comparison of FIGS. 8-9, showing so inclined passageways for comparison with the straight passageways of FIG. 1. Turning first to FIG. 1, it will be seen that the straight passageways 28 upon emerging from the slurry to tank 10 tend to form a pool 29 behind the screen 20 and the filter cake thereon. This causes a degree of backflow through the filter cake tending to remove it from the screen 20.

On the other hand, by inclining the passageways at an angle of about 20-45 degrees to the radial, no such pool 29 tends to be formed, either as the passageways leave the slurry, as shown in FIG. 8, or at the filter cake removal means, as is shown in FIG. 9. The exact angle of incline is not critical, but, with a given filtrate level, should be parallel to or at a slight angle to the surface of the slurry so that liquid in the passageways will flow into rather than out of the passageways as a passageway passes above the slurry level. In addition to backflow, the inclining of a passageway 28' tends to move the filtrate through the passageways by a fluid ram effect while passing through the slurry, tending to counteract the centrifugal pumping effect otherwise present.

Still another modification of the grid structure of FIGS. 1-6 is shown in FIGS. 10 and 11, wherein a pair of spaced concentric planar strips 22a and 22b are utilized instead of a unitary planar strip, and wherein the waved strip 24a, which extends between the inner and outer surface of the drum, has a raised central portion 27a of its side portion 25a. With such structure assembled as shown in FIGS. 10-11, with the raised central portions 27a of adjacent waved strip portions abutting one another, a pair of radial but connected passageways 28a and 28b are formed, the connection being through the space between the straight strips 22a and 22b. Because of the raised central portions 27a, however, adjacent pairs of passageways are not connected, since with said raised portions attached to each other as by welding as shown in FIG. 11, the passageway which would otherwise exist is filled. The specific construction of the waved strip 24a will be more fully explained hereinafter but waved strips as above described may be used as well.

Yet another modification of the grid structure of FIGS. 1-6, somewhat the reverse of that of FIGS. 10 through 11 is shown in FIG. 12. In that figure, a wide planar strip 40 is provided with waved strips 42 and 45 adjacent each edge thereof, each having respectively side portions 41, 44 and diagonal portions 43, 46, the space between the diagonal portions on at least one side thereof being closed by flaps 48 bent out of the planar strip 40 leaving openings 49 therein. Hence, again, adjacent pairs of passageways are not connected as is required for vacuum operation.

As is shown in FIG. 13, the above described grid structures made up of helical strips may be constructed from straight strip material 30 by pinch rolling between a pair of rolls 32 having converging axes so that the curved planar strip 31 resulting from the rolling process has its outer edge thinner than its inner edge. With the planar flat strips 22, 22', 22a, 22b, the pinch rolling is conducted to produce a strip curved to the desired drum radius. However, with the waved strips 25, 25', 25a, the rolled radius must be such as to provide the drum radius after the crimping step which produces the waved configuration.

It is not essential, nevertheless, that the waved strip be pinch rolled in order to form it into a helix of a predetermined diameter, as may be seen from the configurations of FIGS. 14–18. Referring first to FIGS. 14–17, a waved strip 35 is shown which can be manufactured from a straight strip 33 (FIG. 17) by bending it along lines 34. This not only produces truncated triangular side portions 36 and diagonal portions 38, but a structure wherein the side portions 36 along one side are in a plane with each other and with a planar strip 39 to which they may be attached as is set forth above while the side portions 36 on opposite sides are in parallel planes. The diagonal portions, as may be best seen in FIG. 16, have been twisted so as to provide the planar side portions 36, with the ends thereof at the outside diameter of the drum at a more acute angle to the plane of the planar strip 39 than at the inside diameter. With the so bent structure, the side portions 36, unlike those of FIGS. 1–6, have thin narrower sides at the outer surface of the drum, while diagonal portions 38 are the reverse.

FIG. 18 shows a waved strip 35' generally similar to that of FIGS. 14–17 except for having inclined passageways, such being crimped or otherwise bent to a desired final radius from a straight strip without pinch rolling. Otherwise, the description of the structure of FIGS. 14–17 applies thereto and similar reference numerals but with prime marks have been applied thereto.

With large drums wherein a substantial strip width is necessary to provide sufficient strength and rigidity in the assembled drum, the provision of curved strips produced by pinch rolling becomes a problem principally because of the difficulty in rolling the required difference in thickness between its opposite edges, although the necessity of starting with a strip thicker than needed for structural reasons is also wasteful of metal and tends to make a heavier drum. However, by utilizing waved strips like those shown in FIGS. 14–18, to provide a structure like that of FIG. 10, the necessity for pinch rolling the wide waved strip is eliminated, while the narrow planar flat strips do not present the problem, being less than one third the depth of the waved strip.

Whether or not either of the strips be pinch rolled, nevertheless their preparation from commercial strip material is important, not only from the standpoint of economy, but because the edges of such strips are rounded and remain so in the completed drum because no grinding or other machining is necessary on its outer surface, in contrast to heretofore known drums. This is highly important in the life of the screen 20 applied around the drum, and results in much longer screen life, as well as reducing the possibility of damage thereto when it is applied to the drum.

In operation the material to be filtered is introduced into the tank through inlet 17 as the drum is rotated. The liquid in the mixture flows through the foraminous surface of the drum into the interior thereof and as the drum rotates in a clockwise direction a pulp mat of the solids is accreted on the surface thereof. The liquid component drains into the interior of the drum and is extracted through a conduit in the end wall 14. As the mat approaches the discharge chute the air pressure applied through pipe 21 tends to free the mat from the foraminous surface and the mat is transferred to the chute for removal and further processing as desired.

While a preferred embodiment of the invention has been shown and described it will be understood that the invention is not intended to be limited thereto or to details thereof and departures may be made therefrom within the spirit and scope of the invention as defined in the claims.

We claim:

1. In a rotary filter including a self-supporting cylindrical drum having a foraminous surface disposed for rotation about an axis in a tank, said drum comprising a cylindrical tubular grid structure formed of annular planar strip means extending around the circumference of the cylindrical grid with its widthwise dimension disposed radially thereof, and waved strip means extending around the circumference of the cylindrical grid with its widthwise dimension disposed radially thereof, said waved strip means consisting of alternating generally diagonal segments with connecting segments therebetween, with said connecting segments being positioned on opposite sides of the central plane of said waved strip means and said diagonal segments crossing said central plane, said planar strip means and said waved strip means being arranged adjacent to each other and alternating with respect to each other to form said grid structure, and connecting segments of said waved strip means being fixed directly to adjacent planar strip means providing a grid having generally radial passages with walls defined by both of said strip means.

2. In a rotary filter including a self-supporting cylindrical drum having a foraminous surface disposed for rotation about an axis in a tank, said drum comprising a cylindrical tubular grid structure formed of annular planar strip means extending around the circumference of the cylindrical grid with its widthwise dimension disposed radially thereof, and waved strip means extending around the circumference of the cylindrical grid with its widthwise dimension disposed radially thereof, said waved strip means consisting of alternating generally straight and diagonal successive segments generally in the form of truncated triangles, with said straight segments being positioned on opposite sides of the central plane of said waved strip means, said straight segments being generally parallel to said planar strip means, and to each other, said diagonal segments crossing said central plane, said planar strip means and said waved strip means being arranged adjacent to each other and alternately with respect to each other to form said grid structure, and straight segments of said waved strip means being fixed directly to adjacent planar strip means providing a grid having generally radial passages with walls defined by both of said strip means.

3. In a rotary filter including a self-supporting cylindrical drum having a foraminous surface disposed for rotation about an axis in a tank, said drum comprising a cylindrical tubular grid structure formed of a pair of radially spaced helically formed annular planar strips extending around the circumference of the cylindrical grid for a plurality of turns with their widthwise dimensions disposed radially thereof, and a helically formed waved strip extending continuously around the circumference of the cylindrical grid between adjacent turns of said pair of planar strips for a plurality of turns with its widthwise dimension disposed radially thereof and extending continuously between the inner and outer cylindrical surfaces of said grid, said waved strip consisting of alternating generally straight and diagonal successive segments generally in the form of truncated triangles, with said straight segments being positioned on opposite sides of the central plane of said waved strip, said straight segments being generally parallel to said planar strips, and to each other, said diagonal segments crossing said central plane, said planar strips and said waved strip being arranged adjacent to each other and alternately with respect to each other to form said grid structure, and straight segments of said waved strip being fixed directly to adjacent planar strips providing a grid having generally radial passages with walls defined by said strips.

4. A grid structure as claimed in claim 1 wherein said planar strip means consists of at least a pair of radially spaced concentric circularly formed straight strips, said waved strip means being joined to said straight strips and bridging the space therebetween.

5. A grid structure as claimed in claim 2 wherein said waved strip means diagonal segments are in the form of twisted planes with the edge thereof adjacent the outer diameter of said cylindrical tubular grid structure at a more acute angle than the portion radially inwardly therefrom.

6. A grid structure as claimed in claim 1 wherein the waves of said strip are inclined in respect to the direction of rotation of the drum to provide passages at an angle to a radius of said grid at said passages.

7. A grid structure as claimed in claim 3 wherein said waved strip is of uniform thickness having the narrower side of the straight segments outward and the narrower side of the diagonal segments inward, said diagonal segments being in the form of twisted planes with the edges thereof adjacent the outer diameter of said cylindrical tubular grid structure being at a more acute angle thereto than that of the inner edges.

8. A grid structure as claimed in claim 7 wherein depressions are provided on the straight segments adjacent one another filling the space between said pair of planar strips and abutting one another.

References Cited in the file of this patent

UNITED STATES PATENTS

| | | |
|---|---|---|
| 2,654,124 | Layte | Oct. 6, 1953 |
| 2,696,309 | Bultman | Dec. 7, 1954 |
| 2,803,172 | Trotman | Aug. 20, 1957 |

FOREIGN PATENTS

| | | |
|---|---|---|
| F 12,814 IV$_c$ | Germany | Dec. 15, 1955 |